United States Patent [19]

Camp et al.

[11] Patent Number: 6,076,078
[45] Date of Patent: Jun. 13, 2000

[54] ANONYMOUS CERTIFIED DELIVERY

[75] Inventors: Linda Jean Camp, Livermore, Calif.; Justin D. Tygar; Michael R. Harkavy, both of Pittsburgh, Pa.

[73] Assignee: Carnegie Mellon University, Pittsburgh, Pa.

[21] Appl. No.: 08/800,504

[22] Filed: Feb. 14, 1997

Related U.S. Application Data

[60] Provisional application No. 60/011,145, Feb. 14, 1996.

[51] Int. Cl.[7] ........................................................ G09C 3/00
[52] U.S. Cl. .............................. 705/65; 380/268; 705/66; 705/67; 705/68; 705/69; 705/71; 705/75; 705/76; 705/77; 705/78
[58] Field of Search ................................. 380/21, 23, 24, 380/30, 54, 59; 364/478.04, 478.03, 478.09, 400, 478.13, 478.14, 478.15, 479.02, 479.07; 902/2, 4, 5, 25, 41; 705/65–68

[56] References Cited

U.S. PATENT DOCUMENTS

| | | | |
|---|---|---|---|
| 4,759,063 | 7/1988 | Chaum ........................................ | 380/30 |
| 4,977,595 | 12/1990 | Ohta et al. ................................. | 380/24 |
| 4,987,593 | 1/1991 | Chaum ........................................ | 380/3 |
| 5,191,573 | 3/1993 | Hair ............................................ | 369/84 |
| 5,224,162 | 6/1993 | Okamato et al. .......................... | 380/24 |
| 5,276,736 | 1/1994 | Chaum ........................................ | 380/24 |
| 5,383,113 | 1/1995 | Kight ......................................... | 364/401 |
| 5,440,634 | 8/1995 | Jones et al. ................................ | 380/24 |
| 5,511,121 | 4/1996 | Yacobi ....................................... | 380/24 |
| 5,745,678 | 4/1998 | Herzberg et al. .......................... | 395/186 |
| 5,748,740 | 5/1998 | Curry et al. ................................ | 380/25 |
| 5,768,385 | 6/1998 | Simon ........................................ | 380/24 |
| 5,796,841 | 8/1998 | Cordery et al. ............................ | 380/55 |
| 5,809,144 | 9/1998 | Sirbu et al. ................................ | 380/25 |
| 5,832,089 | 11/1998 | Kravitz et al. ............................. | 380/24 |

OTHER PUBLICATIONS

J. Champ, et al., "Anonymous Atomic Transactions,"The Second USENIX Workshop on Electronic Commerce Proceedings, 1996, pp. 123–133.

D. Chaum, "Security Without Identification: Transaction Systems to Make Big Brothers Obsolete,"Communications of the ACM, v. 28, No. 10, Oct 1985, pp. 1030–1044.

D. Chaum, "Online Cash Checks,"Advances in Cryptology–EUROCRYPT '89 Proceedings, Springer–Verlag, 1990, pp. 288–293.

D. Chaum, et al., "Efficient Offline Electronic Checks", Advances in Cryptology EUROCRYPT '89 Proceedings, Springer–Verlag, 1990, pp. 294–301.

R. Hirshfeld, "Making Electronic Refunds Safer,"Advances in Cryptology–Crypt '92 Proceedings, Springer–Verlag, 1993, pp. 106–112.

R.J.F. Cramer, "Improved Privacy in Wallets with Obsevers, "Advances in Cryptology–EUROCRYPT '93 Proceedsing, Springer–Verlag, 1994, pp. 329–343.

S.A. Brands, "An Efficient Off–line Electronics Cash System Based on the Representation Problem,"Report CS–R9323 Computer Science/Department of Algorithms and Architecture, CWI, Mar. 1993.

*Primary Examiner*—Tod R. Swann
*Assistant Examiner*—Paul E. Callahan
*Attorney, Agent, or Firm*—Kirkpatrick & Lockhart LLP

[57] ABSTRACT

A number of fault-tolerant methods for purchasing digital goods with a digital token over a network in which the token's value resides either with a customer or a merchant are disclosed. One version of the method comprises the steps of establishing a price with a merchant for a digital good. A merchant-signed invoice and the digital good in encrypted form are then sent from the merchant to the customer. The invoice is signed with the customer's signature to produce a countersigned invoice. The countersigned invoice, a token (which can be an anonymous token), and identifying information for the token are sent from the customer to the merchant. The countersigned invoice, the token, and the identifying information are sent from the merchant for verification. The token is verified with the identifying information and the other information in the countersigned purchase order is checked. The transaction is committed when the token and other information in the countersigned purchase order are verified such that the value of the token is transferred from the customer to the merchant. The transaction is then completed by providing the customer with the key for decrypting the encrypted goods.

64 Claims, 8 Drawing Sheets

ANONYMOUS CERTIFIED DELIVERY

CROSS-REFERENCE TO RELATED APPLICATIONS

This application claims priority under 35 U.S.C. § 119(e) to U.S. Provisional Application Serial No. 60/011,145, filed Feb. 14, 1996.

BACKGROUND

1. Field

The present disclosure is directed generally to communications protocols, and more particularly to methods of carrying out commercial transactions over a computer network.

2. Description

There is a trade-off between anonymity and reliability in transactions in all current electronic commerce systems. The relationship between anonymity and atomicity in electronic transactions is an open question. Some systems make reliability paramount and limit anonymity. Some systems attempt to provide both by providing conditional anonymity. Some systems provide anonymity at the price of reliability.

U.S. patent application Ser. No. 519,074, filed Aug. 24, 1995 and entitled Method and Apparatus for Purchasing and Delivering Digital Goods Over a Network, which application is assigned to the same assignee as the present invention, discloses a method for conducting an atomic transaction in which delivery of digital goods is carried out in a certifiable manner. In that protocol, provision is made for allowing transactions to take place under pseudonyms. However, the protocol is designed to provide the merchant with a customer identity, albeit a pseudonym. Thus, the need exists for an atomic transaction protocol that is anonymous.

There has been other work on Electronic commerce systems that:

provide methods for anonymous payment (type 1) or provide highly atomic protocols so that receiving a merchandise item is strongly associated with paying for the same merchandise (type 2).

Type 1 methods (anonymous payment) have revolved around protecting customer privacy through the use of token-based electronic payment protocols (so-called "digital cash" protocols.) These tokens are meant to act as a type of currency: they can be used to purchase merchandise, but like coins, they do not reveal the identity of the holder. These systems offer privacy in making a purchase. They provide customers with the ability to make anonymous purchases, purchases which cannot be tracked by a bank to identify the purchaser.

A stronger form of anonymity can be considered—anonymity in which the identity of the purchaser is hidden from both the bank and the merchant selling the merchandise. This raises the question of how the merchant will transmit the merchandise to the consumer without knowing the consumer's identity. A standard way of accomplishing this is through the use of intermediaries known as anonymizers or anonymous forwarders. If we have non-trackable tokens, then it is straightforward to use anonymizers to realize purchases that are anonymous to merchants, banks, and third parties.

The present prior art systems, however, are not fault tolerant. That is, ambiguous states arise when things go wrong. For example, if the network or merchant server goes down during a purchase, there is no mechanism to complain about non-delivered goods. If the purchases are anonymous, there is no way to prove that the customer really did pay and did not receive the merchandise. There is no trail to enable automated judges to adjudicate these complaints. Existing protocols are not sufficiently robust to enable judges or merchants to determine whether the customer was really denied the merchandise or whether the customer is just trying to illegitimately acquire merchandise for free. There is no mechanism in place to enable a customer to obtain satisfaction when the purchase is anonymous. These questions are especially important because the Internet today is an unreliable network—anyone who has spent some time browsing the World Wide Web knows that communications often fail. Unscrupulous customers and merchants will certainly attempt to take every advantage of system failures.

To illustrate the problem, consider the following simplified digital cash protocol: customers pay for digital merchandise with tokens. These tokens are anonymous, but designed so that if the customer ever uses the same token twice, the customer's identity is revealed. Suppose a customer pays for merchandise, but before she can receive acknowledgment that the merchant received payment, the network fails. Because the customer doesn't know whether the merchant received the payment or not, she has two basic strategies.

The first strategy is to spend the token again, by returning her token to the bank or spending it with a second merchant. But then, if the first merchant really did receive the token, she may be creating a race condition (i.e., a situation where, depending on timing, an inconsistent state may be created.) Whoever gets the token to the bank first will get the money. Worse, when both tokens do reach the bank, the customer will be accused of double-spending. One can imagine variations on the digital cash protocol where a customer might file a special type of complaint with a bank, but the design of this variation is non-trivial. Most types of variations will either reveal the customer's identity, allow a new type of fraud, be subject to ambiguous results if a message is not delivered, or have other undesirable effects. This topic is considered at length in: L. Jean Camr, Marvin Sirbu, and J. D. Tygar, Token and notational money in electronic commerce, In *Proceedings of the First USENIX Workshop in Electronic Commerce*, pages 1–12, July 1995; J. D. Tygar, Atomicity in electronic commerce, In *Proceedings of the Fifteenth Annual ACM Symposium on Principles of Distributed Computing*, pages 8–26, May 1996 (based on a presentation given in August 1995.); and Bennet S. Yee, *Using Secure Coprocessors*, PhD thesis, Carnegie Mellon University, 1994.

The second strategy is to wait and not spend the money. But in that case, the customer has locked up her funds. If the merchant did not receive her payment, then the customer may be waiting for a very long time.

Methods of type 2 have addressed the question of reliability through the use of ACID (atomic, consistent, isolated, durable) transactions. See, for example, J. Gray and A. Reuter, *Transaction Processing*, Morgan-Kaufmann, 1993. These protocols have achieved fault-tolerance, that is, the ability to handle arbitrary communication failures and component failures of any party. In any case, the distributed system should always be in a consistent state: parties should agree on whether a transaction succeeded or not; when repairs are made, the distributed system should be able to continue processing without interruption.

In the distributed systems community, ACID transactions have been widely adopted as a standard mechanism for realizing fault-tolerant distributed transactions. Payment transactions should be failure-atomic, so that failures in parts of the system will not leave the entire system in some ambiguous, intermediate state.

The literature has suggested that these transactions be interpreted in the context of electronic commerce by using the classifications set forth below. Suppose we have a model where customers are purchasing digital merchandise and services that will be delivered over a network (e.g. a World Wide Web page). For tangible physical merchandise, alternative definitions are required to properly satisfy the atomicity property (motivating a multi-billion dollar industry in tracked, receipted courier delivery of messages and packages). The literature (See, for example, Tygar, Supra.) gives three classes of atomicity for digital merchandise.

Money atomic transactions feature atomic transfer of electronic money—the transfer either completes entirely or not at all. In money atomic protocols, money is not created or destroyed by purchase transactions.

Goods atomic transactions are money atomic and also ensure that the customer will receive merchandise if and only if the merchant is paid. Goods atomic transactions provide an atomic swap of the digital merchandise and funds—similar to the effect of "cash on delivery" parcels.

Certified delivery protocols are goods atomic and also allow both the customer and merchant to prove exactly what was delivered. If there is a dispute, this evidence can be shown to a judge to prove exactly what merchandise were delivered. Using this classification, we can see that the simplified digital cash protocol described above is not money atomic.

Additional problems are raised in an anonymous atomic transactions. Indeed, the literature has speculated that anonymous atomic transactions might not even be possible. A traditional attempt to solve this question might be to use standard ACID techniques to make a digital cash transaction atomic. The most common method for ACID transactions is two-phase commitment. In short, in two-phase commitment, one party assumes the role of transaction coordinator. That party knows and records the identities of all other parties in a non-volatile archive. Each of the parties records its state before the transaction begins. As the transaction moves forward, various parties complete their required computation. Before changing the permanent store of those values, the parties send a message to the coordinator indicating that they are ready to commit. Alternatively, they may abort the transaction by sending a negative message to the coordinator. After receiving ready messages from all parties, the coordinator issues a commit message to all parties, causing the transaction to become permanent. Alternatively, if the coordinator receives an abort request or if the coordinator cannot establish contact with one of the parties, the coordinator can abort the transaction by sending an abort message; in that case, all parties reverse the computation that they conducted towards the transaction.

The two-phase commit protocol requires that at least one party participating in the protocol (the transaction coordinator) knows the identity of all the parties involved. Additionally, two-phase commit assumes; a fail-stop fault model, where the parties to the protocol can fail by stopping due to a crash or system failure, but not by lying or otherwise trying to cheat. In electronic commerce protocols, of course, we must be able to tolerate arbitrary faults (Byzantine faults). One way to do this is to provide sufficient auditing information to detect these faults and later assign responsibility. This makes the standard two-phase commit protocol inappropriate for use in anonymous electronic commerce systems.

An alternative approach to this problem was attempted by Jakobsson, Ripping coins for a fair exchange, In Louis C. Guillou and Jean-Jacques Quisquater, editors, Advances in Cryptology: Eurocrypt '95 Proceedings, Springer-Verlag 1995, where the payment protocol is divided into two halves. Here, the digital cash is "rip-spent": after the first half of the spending protocol, the customer has committed to buying from the merchant but has not yet spent the money—some partial information is transferred, so that if the customer attempts to abort the transaction, the digital cash is either lost (becomes unusable), or the identity of the customer is revealed. This approach is not satisfactory: each of the half protocols themselves may be interrupted, leaving the digital cash again in an ambiguous state. Thus, the need exists for a fault tolerant, atomic, transaction protocol that can maintain the anonymity of the customer.

SUMMARY

In this disclosure, we disprove the commonly held belief that an atomic transaction (money atomic, goods atomic, certified delivery) cannot be accomplished anonymously. We present a protocol and several variations for electronic commerce transactions which combine anonymity and atomicity while requiring very limited trust assumptions. We also discuss the goods atomicity properties of the protocols.

The disclosed system has four elements: a customer, a bank, a merchant and a public archive. The bank can issue verifiable token currency. The technique for creating or verifying a token is known in the art and not considered here. The customer can generate primes and composites necessary for a public key set. A customer can sign documents and verify signatures. A merchant can verify public key signatures, sign documents and accept payment. The archive can create write-once records, sign documents and verify signatures. Those capabilities imply certain security assumptions: that the secret key of a set of public keys is not disclosed and that the bank can distinguish those tokens to be used with certified delivery and refuse deposit of them without archive approval.

There are four functions that need to be distinguished in the disclosed protocol. There is a one way collision free hash function, and public and private key encryption. Those are denoted as follows, when the variable being encrypted or hashed is x:

$h(x)$ the hash of x $E_k(x)$ x, encrypted with symmetric key k $P_i(x)$ x, encrypted with the public key of i's private key set $S_i(x)$ x, encrypted with the secret key of i's private key set The anonymous certified delivery protocol can be used with any token currency. Because the protocol itself requires on-line verification, both on-line and off-line anonymous coins or tokens can be used. There is an assumption here that each token is used only once. If coins could be used twice, the protocol could be subverted by the merchant simply registering the key again. It is necessary that the bank be able to distinguish those tokens which will be used with certified delivery, or to accept no tokens except those with the archive's approval.

The fundamental basis of the anonymity in this protocol is that public keys need not be linked to identity, the public key can be unique to the token. The fundamental fact that makes this protocol atomic is that the token is not exposed until the customer has a signed purchase agreement and encrypted merchandise, and depositing the token requires registering the key.

There are two variations of certified delivery. One-sided delivery is where the customer can prove what merchandise was delivered in case adjudication is needed (e.g., the merchandise does not match its description). The merchant is paid if and only if the customer successfully obtains the digital merchandise. On the other hand, the merchant cannot prove that the customer successfully received the merchandise promised. This is the protocol presented in section 1 below. We argue that if the burden of proof is on the customer, then this method suffices to allow the customer to prove the results of the transaction.

Two-sided certified delivery provides proof of the delivery of specific contents to both parties. We discuss this as a specific variation later.

In the present disclosure, the need for a trade-off between reliability and anonymity is removed at the price of increased processing. The disclosed system is optimized for information goods delivered on-line, yet it can also be used to provide payment receipts for other types of purchases. Also, while the discussion here is devoted to the case on anonymous purchases, the same (or, if desired, very similar) protocols can be used even if the parties reveal their identities to provide a novel set of fully atomic (non-anonymous) electronic payment protocols. Those advantages and benefits, and others, will become apparent from the Description of the Preferred Embodiments hereinbelow.

BRIEF DESCRIPTION OF THE DRAWINGS

For the present invention to be clearly understood and readily practiced, the present invention will be described in conjunction with the following figures wherein.

DESCRIPTION OF THE PREFERRED EMBODIMENTS

Any transaction can be separated into two sections: the preparation and the purchase. Note that the preparation steps can be batched with multiple tokens.

Figure 1:
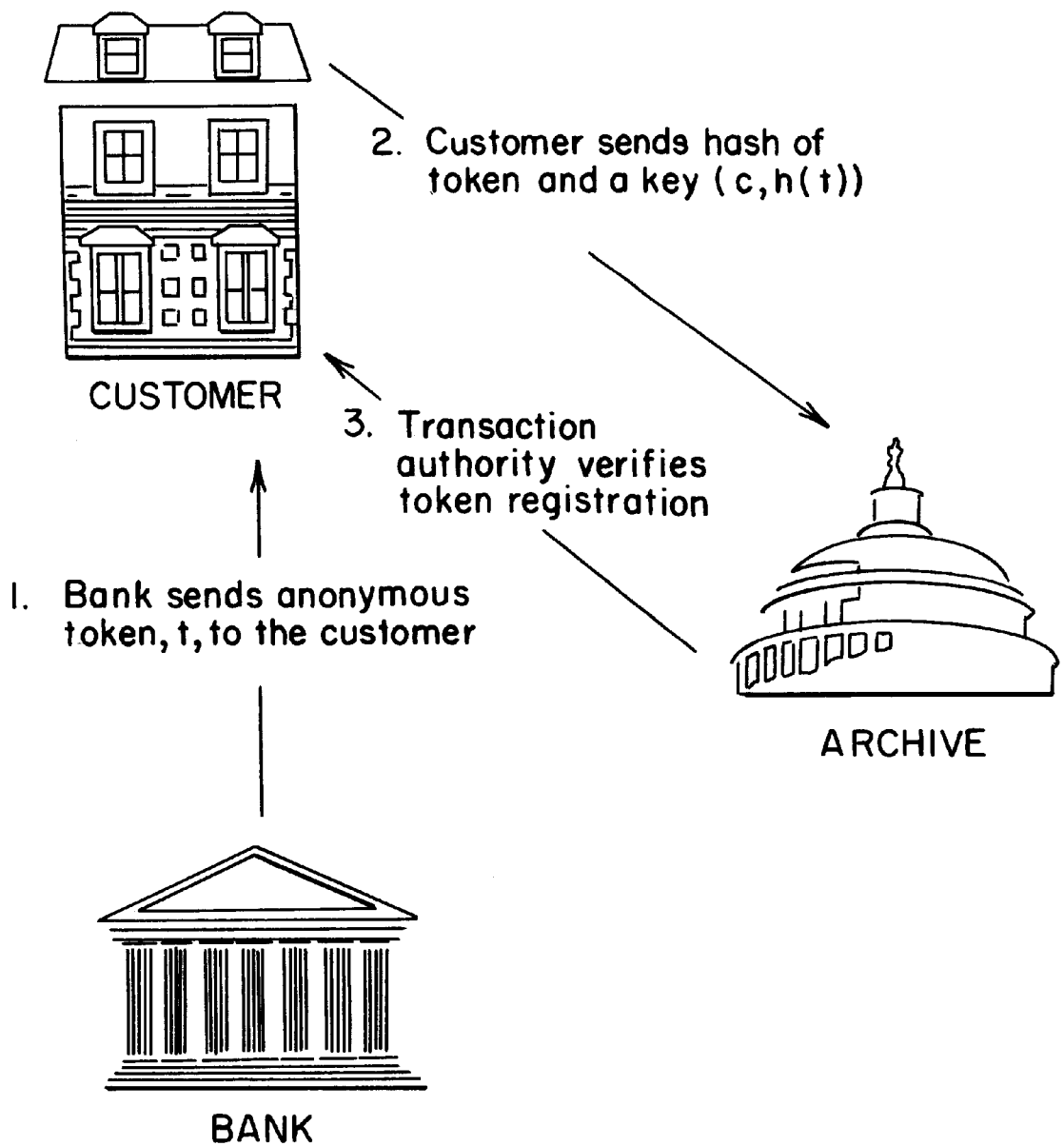
FIG. 1 is a diagram illustrating the steps necessary to prepare for a transaction according to one embodiment.

FIG. 1 illustrates the preparation steps required in one embodiment before a purchase. In the first step, the customer obtains an anonymous token from a bank. That step includes all the steps necessary to obtain an anonymous electronic coin or token, as is known in the art.

In the second step, the customer constructs the information necessary to register the token with an archive. To register the token, the customer must generate a token-specific public key and a hash value. Notice that the key needs only to be strong enough to make breaking it cost as much as the token it protects. The registration message includes a hash of the token and a token-specific public key.

| msg 2:c->a | $(h(t)\_p_t)$ |
|---|---| where $p_t$ is the public key that corresponds to the token. This message could be further encrypted with the public key of the archive. However, the message has enough information to confirm the validity of a payment and the corresponding endorsed receipt.

Because there is neither opportunity for false profit nor harm to the user created by making this information public, there is no reason to hide the information.

In the third message the archive verifies the receipt of the token. This message is signed by the archive and includes the registration information.

| msg 3:a->c | $S_a(h(t),p_t)$ |
|---|---|

Figure 2:
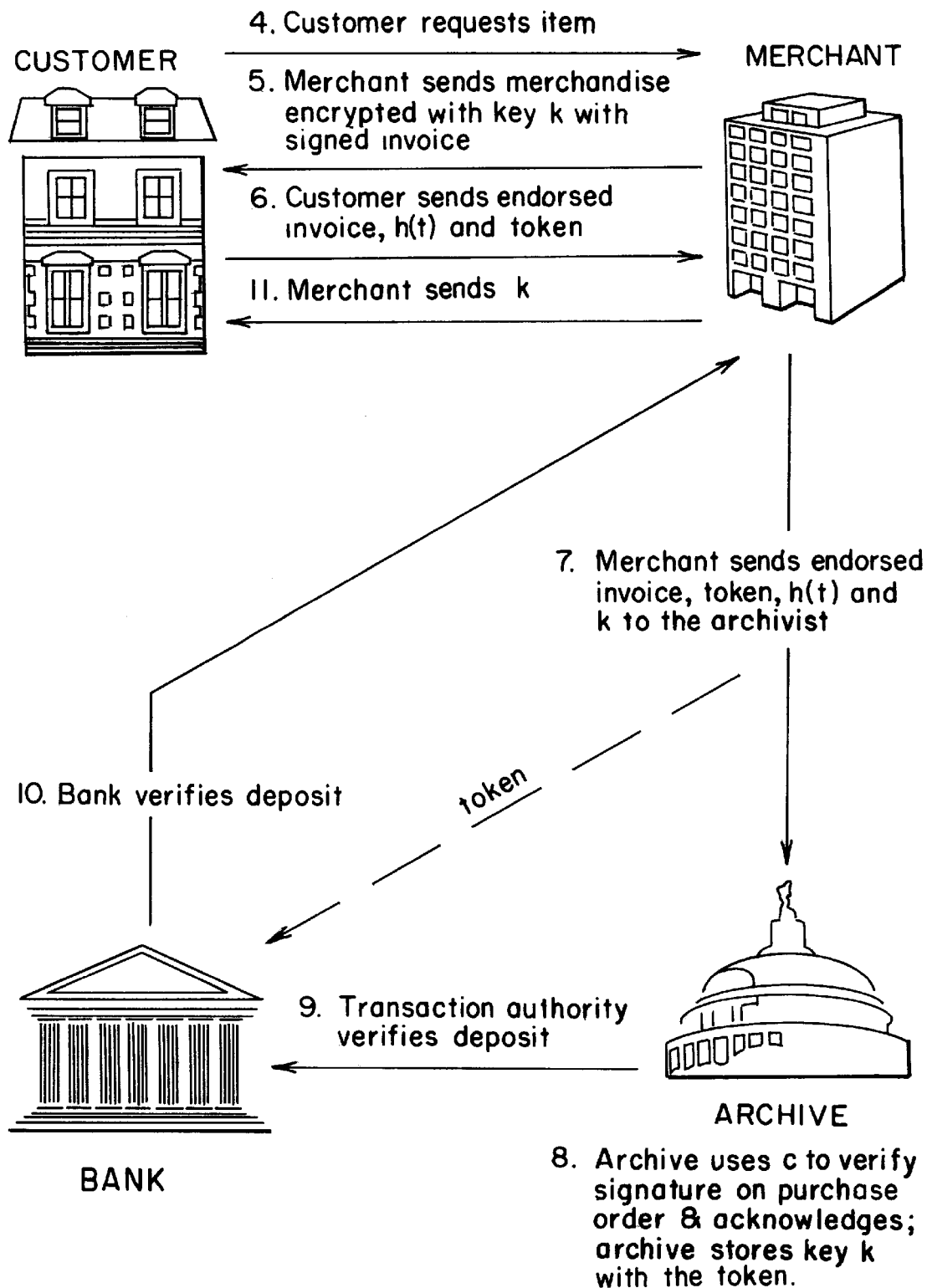
FIG. 2 is a diagram illustrating the steps of an anonymous purchase with certified delivery of the goods.

At this point the customer can make a purchase. A purchase is shown in FIG. 2.

We use an idea of commitment similar to the standard notion from the transaction processing literature to realize the protocol. In the protocol and variations, prior to completing the transaction, all parties must commit to the transaction. These individual commitments (sometimes called local commitments) must be performed by all parties to the protocol—including the merchant, the customer, and the system components: the bank and the archive. If all the parties commit within the time allowed, then the transaction as a whole commits, (this is sometimes called global commitment.) On the other hand, if any one party does not commit, then the transaction aborts, and the state of the merchant and customer is restored as if the transaction had never begun: the customer still has the value of her money; the merchant still has his merchandise which will not have been transferred to the customer as part of the transaction.

The purchase begins with negotiation. See, for example, the aforementioned U.S. patent application Ser. No. 519,074, which is hereby incorporated by reference. When the customer and merchant have agreed upon the conditions of the purchase then the merchant can send the requested item, and an invoice. The invoice may be as follows:

| msg 5:m->c | Ek(merchandise), Sm[hash (item as delivered encrypted), h(k), price, date, hash(item description)]. |
|---|---|

By including the hash of the item promised, instead of the actual item promised, the archive will not contain the description of the item.

The customer signs the invoice and includes the token in a response. The customer's reply may be as follows:

| msg 6:c->m | Pm(token, h(t)) _ Sc{Sm[hash (item as delivered encrypted), h(k), price, date, hash(item description)]}. |
|---|---|

The merchant must send the token, the key and the invoice to the archive. Message seven may be as follows:

| | |
|---|---|
| msg 7:m->a | Pa(token, h(t),k) _ Sc{Sm[hash (item as delivered encrypted), h(k), price, date, hash(item description)]}. |

The archive then identifies the appropriate public key corresponding to Sc using h(t). The archive may confirm that price and token value are the same. The archive then stores the key value along with h(t) and the token. The archive then verifies the deposit to the bank. The archive may do this by sending verification to the merchant in the form Pm [Sa (token)], or the archive may send an actual deposit request to the bank. The archive may retain records for dispute resolution. Furthermore, only in the case of a valid deposit can the archive produce a signed receipt.

The bank confirms the deposit to the merchant, and the merchant sends the key, k, to the customer.

The merchant may claim that the archive refused to verify the token and signature set. The customer can then complain to the archive. The archive will know the deposit was authorized and provide the customer with the key to the goods.

If, upon the decryption, the customer finds that the merchant did not send valid merchandise the customer can complain to the bank or archive. The customer can prove that the merchant promised to deliver certain goods, and delivered other encrypted goods. The archive then tells the bank to delete the credit from the merchant's account. The customer can use the same key and begin a new transaction. Thus the customer can prove that the merchant failed to provide adequate service and easily obtain a discount without having her account altered, and therefore by necessity her identity revealed.

If the archive deposits the token to any account but the merchant's, the merchant can present the token to the bank and demand that the archive provide proper record of a transaction. The archive will be unable to provide a signed invoice, and the merchant can prevail.

If the archive decides to simply deposit the coin and claim that the customer defrauded the merchant, the merchant will notify the customer. The customer then has a token, proof that the token was registered under public key c, and proof in the form of an invoice that a transaction has been attempted. The customer can then go to the bank, and report that the archive did not allow a valid transaction. The bank can query the archive and demand proper documentation. If the archive does not have a signed and endorsed invoice the bank can reverse any inappropriate credit made. Thus any misrepresentation or error of the archive can be detected and addressed.

Notice that the customer can complain at all times under the token-specific key and need not prove her identity nor provide her account number. Thus this goods-delivery protocol provides anonymity, atomicity and dispute resolution.

Security

The reliability of the token-generating system is a function of the system used to generate the token. Points of failure unique to the anonymous certified delivery protocol are the secret keys of the parties involved and the key to the merchandise.

If the customer can obtain the key to merchandise the customer can refuse to pay. That is fraud. Those keys are generated by the merchant, and the merchant is the party at risk to that sort of fraud. That suggests that merchants should take appropriate action in their key selection techniques.

If a customer loses their token-specific public keys, a false invoice could be created. However, without the token, such an invoice would be worthless.

If a customer loses their token, then the token can be used to order goods. However the attacker will be unable to endorse an invoice, so the theft will be detected before the attacker obtains decrypted goods.

If an archive loses its key, then a false archive can collect and deposit tokens when sent for verification. That attack can be detected after merchant and customer complaints. The damage done by the loss of a bank key depends upon the protocol used to generate tokens.

Other Embodiments

This protocol may be implemented with a completely passive archive, where the archive is only a record. In this case the archive would be a completely public record with no encrypting capabilities. The hash of the token would provide a unique record address. Any user can create new records, add to a record, or read a record. No user can delete a record. That would change the steps above as follows.

| | |
|---|---|
| msg 3:c->a | customer reads archive to confirm registration |
| msg 4:c->m | h(t) must be included |
| msg 5:m->c | Ek(merchandise), Sm[hash (item as delivered encrypted), h(k), h(t), price, date, hash(item description)] |
| msg 6:c->m | Pm(token, h(t)) _ Sc{Sm[hash (item as delivered encrypted), h(k), h(t) price, date, hash(item description)]} |

Now, in cases of conflict, the record number is included for dispute resolution. Note that the registration information to the archive and to the bank must change as follows:

| | |
|---|---|
| msg 7:m->a | Pb(token, h(t), k) _ Sc{Sm[hash (item as delivered encrypted), h(k), price, date, hash(item description)]} |
| msg 8:m->b | Pb(token, h(t), k) |

The symmetric key used in the merchandise can be included in either the message to the bank or to the archive it need not be in both. However, both the bank and the archive must have h(t), as it serves as an address.

The merchant may try to misdirect the bank, perhaps in an attempt to replay a previous transaction for the purpose of avoiding delivery responsibilities. In that case, the customer has the signed receipt which verifies without identifying both the item and the token paid for it.

In other cases the information available for dispute resolution is as above. However, in this case, the archive never 'sees' the token and therefore the archive cannot attempt fraud.

Another embodiment of the protocol illustrated in FIG. 2 is illustrated by the broken line extending from step 7 to the bank. According to this modification of the protocol, the merchant sends the token directly to the bank rather than to the archive. The archive then performs the functions as previously described in conjunction with FIG. 2, but the archive only provides a verification to the bank because the bank already has the token.

Figure 3:
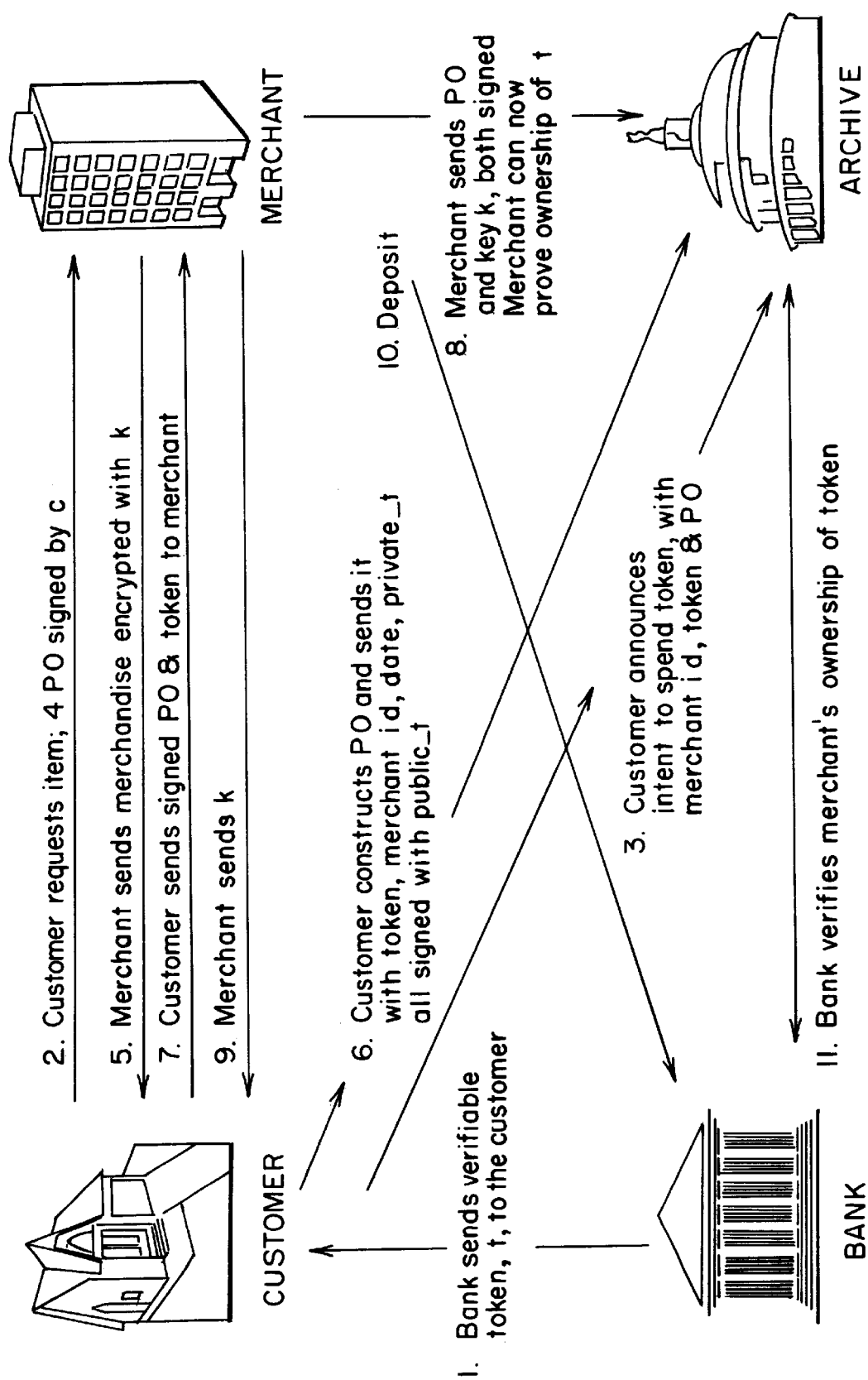
FIG. 3 is a diagram of an alternative embodiment of the present invention.

FIG. 3 illustrates another embodiment of the protocol of the present invention which is an anonymous, atomic delivery with two-phase commit. A primary difference from the protocol illustrated in FIG. 2 is that after the customer provides a signed purchase order to the merchant, the customer announces its intent to spend the token to the archive. The message may contain the merchant ID, the token, and the purchase order as follows:

| | | |
|---|---|---|
| msg 3: c-> a: | PO, t, M, verif t, [expiry] | |

That message is placed in the public archive as sign A (PO, t, M, verif t, [expiry]). The affect is to announce that t belongs to either whoever knows sign t or M. In step 4, the following message is sent from the customer to the merchant:

| | | |
|---|---|---|
| msg 4: c-> m | sign t (PO) | |

Steps 5, 6, and 7 are as shown in FIG. 3. At step 8, the merchant sends a message of the following form to the archive:

| | | |
|---|---|---|
| msg 8: m-> a | sign M (sign t (PO)k) | |

By publishing the doubly signed purchase order and key, M claims ownership of t. It is the bank's obligation to verify that t belongs to x prior to crediting t to x.

With the protocol disclosed herein, a public key is needed for each new token. Because the customer is the only one with the private key, there is no reason that a single public key could not be used multiple times. The probability that anonymity is maintained is a function of the frequency of use, duration of use, and breadth of use. That is, the probability of linking the public key to real identity decreases as the public key is used in many locations, and frequently, or over a long time period.

It may provide an advantage to combine the archive and the bank. However, that may entail new problems because the bank must have the highest level of security while an archive does not.

One very promising application for this protocol is the possibility of combining this protocol with physical purchases. With the delivery to a Post Office which has smart card readers, consumers with smart cards could order physical goods and provide verifiable receipts to the merchant. That could remove the need for both the presumption of fraud and customer identification in current mail and telephone order purchases.

Should a merchant attempt theft, this protocol can recover. However, it is unlikely that a customer would want to deal with an archive that required regular bank oversight to deliver verification and keys as necessary.

Finally, note that the business issues, such as funds availability and the procedures for dispute resolution, must be timed so that recovery means recovery of a valuable token. If a customer can determine that theft has occurred after a corrupt archive manager has absconded with funds, then the value of anonymous rollback of bits is debatable.

Further Embodiments

The basic anonymous certified delivery protocol can be modified in a variety of ways to improve efficiency and make the security and atomicity properties even more robust. The purpose of this and the following sections is to present these modifications to the protocol and to elaborate on some of the issues surrounding them.

In the protocol of FIG. 2, message 5 includes $E_k$[merchandise]. Later, k becomes known to other parties (e.g. the archive). In the protocol discussed below in section 1, $E_k$[merchandise] is known only to the merchant and customer. That prevents any party other than the merchant or customer from determining merchandise even if that party knows k.

In the protocols already discussed, the archive acts both to control tokens (prevent respending) and to provide a commitment point for the transaction. As discussed below in section 1, those roles may be separated, with the bank taking over the role of controlling tokens. That separation allows a lower degree of trust in the archive. The issue is further discussed in sections 4 and 5. Additionally, this change allows any token to be used at any archive, rather than having each token be restricted to a single archive.

In section 1 below, we introduce a transaction expiration time (expiration). The expiration tire ensures that either the transaction commits within a specified time frame or it aborts. We also introduce a transaction ID (n) which explicitly links all the messages from a single transaction together.

Token withdrawal and registration (steps 1–3 in FIG. 1) are not further addressed in section 1 or thereafter. Methods for token withdrawal are well known. The registration procedure in FIG. 1 may leave the possibility of nuisance registrations blocking legitimate registrations (through a denial-of-service attack). Encryption of the registration message (step 2 in FIG. 1), together with external adjudication in the worst case, can solve this problem.

There are a few differences in the terminology from the previous discussion which should be described. As mentioned, we are not dealing with the details of withdrawal and registration, so we will use the word "token" in a more general sense than previously. Henceforth, a token is referred to as a store of value which is non-repudiably associated with an asymmetric key pair. Prior to the transaction, the customer obtains (anonymous) cryptographic control over the value to be used in the transaction. The asymmetric key pair which controls the value will be referred to as Q, q. The token Q* contains information which certifies that q controls the claimed value.

The bank controls the use of the tokens, preventing respending of a single token. The bank prevents respending by tracking spent tokens and "locking" tokens which are currently in use. A token is locked by the bank when it is committed to a transaction by its owner. A token can be locked to only one transaction at a time. If the transaction to which a token is locked aborts, the token will then be unlocked. Once unlocked, a token can be reused. The bank is not necessarily the issuer of the tokens, but a given token is usable at only one bank.

The archive coordinates the transaction, determines if a transaction commits, and reliably stores the data needed to complete a transaction once it has committed. The archive will not commit a transaction whose expiration has passed.

We will refer to the notion of the archive "publishing" a message. Publishing a message consists of storing that message and making it available to all parties. Publishing can range from active (sending copies of the message to the parties immediately) to passive (sending the message only upon request), depending upon implementation details.

The merchandise is the digital data which the customer C wishes to obtain from the merchant M (anonymously). A receipt is a special case of merchandise which indicates that a payment has been made. Receipts are useful in supporting the purchase of delayed or non-digital goods.

The contract (contract) describes any necessary terms and conditions for the transaction (e.g. price, date). It should contain a description of merchandise.

The merchandise key (k) is a symmetric key used to encrypt merchandise. This key is released when the transaction commits and is stored by the archive. (If asymmetric cryptography is used to encrypt the merchandise, then $E_k$[merchandise] should be interpreted as the data which when decrypted with key k will yield merchandise.)

A transaction ID (n) links all messages together. The transaction ID should uniquely identify the transaction. Any dispute involving reuse of n can be resolved against the party selecting the ID.

The protocols rely on cryptography to ensure the accountability of the participants for their signed messages. Therefore, we make the standard cryptographic assumptions that decryption and signature generation require possession of the correct key. All participants should protect their secret keys, and each party should verify the signature of any signed messages it receives.

We use the following notation to describe steps in a protocol.

1. X→Y messagetext—label

Here, the step number of the message is given (this is the first message in the protocol), the message is sent from X to Y, the text of the message is messagetext, and the step is named label.

Section 1—Core Of Modified Protocol

The steps described below and shown in FIG. 4 form the core of the modified protocol's operation. As mentioned earlier, the customer must obtain Q* prior to executing the protocol. Additionally, the customer and merchant should agree on what transaction they wish to take place. This would likely include the essential terms of contract, and might also include values for other variables such as expiration or A (the identity of the archive at which the transaction will be logged).

P1. M→C $S_m$(n,contract,$E_k$(merchandise))—Merchandise$_m$
P2. C→B $S_q$(n,expiration,M,A,Q*)—Authorization$_q$
P3. B→M $S_b$(n,expiration,M,A,value)—Authorization$_b$
P4. M→A $S_m$(n,expiration,k)—Authorization$_m$
P5. (a) A publishes $S_a$($S_m$(n,expiration,k))—Commit
  (b) A publishes $S_a$(n,expiration,M,failed)—Abort In message P1, the merchant sends the encrypted goods and the contract to the customer. The merchant selects a transaction ID (n) which the merchant has never used before. Prior to continuing the protocol, the customer should check that the terms of contract are acceptable.

In message P2, the customer authorizes the transaction using a token and its associated key q. The customer also selects expiration if it has not already been selected. The customer includes the identity (A) of the archive which will record the transaction, which allows message P2 to be unmistakably linked to message P5a or message P5b. Before proceeding with the transaction, the bank must confirm that the token is valid, that it has not been spent, and that it is not currently locked to another transaction. Assuming these conditions hold, the bank must simultaneously lock the token to this new transaction, so that it may not be used again prior to being unlocked.

In message P3, the bank attests that the value will be paid to the merchant if archive A publishes message P5a. Before generating message P4, the merchant should confirm the accuracy of all data in message P3.

In message P4, the merchant sends final authorization to the archive, including the merchandise key. Upon receipt of this message, the archive verifies that expiration has not passed.

If expiration (contained in message P4) has not passed, the archive immediately publishes message P5a. Otherwise, the archive can now publish message P5b.

Once the archive has published message P5a, the transaction has committed and will complete. Completing the transaction includes having the customer obtain message P5a (or message P4) and having the bank obtain message P5a. In the two-way certified delivery case, or if the merchant wishes to minimize his trust in the log, the merchant must also obtain message P5a. In those cases where the archive must send messages directly to the customer or bank, the necessary address information should be sent to the archive. Some of the alternative methods of transaction completion are explained below. In all cases, the archive should produce copies of message P5a or message P5b (whichever is appropriate) upon request to any participant.

Completing the transaction for the customer may involve one or more of the following:

The archive may send message P5a directly to the customer.

The archive may send message P5a to the merchant, who could then send message P4 to the customer.

The merchant may send a copy of message P4 to the customer under the assumption that the transaction will commit. The merchant will depend on the reliability of the archive (see section 4) to assure payment.

Completion of the transaction for the bank may involve one or more of the following:

The archive may send message P5a directly to the bank.

The archive may send message P5a to the merchant, who can then send it to the bank. This assures the merchant of payment, but allows the demands of funds transfer to the bank to be aggregated.

The bank may occasionally poll the archive for collections of transactions.

Completion of the transaction for the merchant may involve one or more of the following:

The archive may send message P5a directly to the merchant.

The merchant may occasionally poll the archive for collections of transactions. This requires greater trust in the archive (see section 4).

Section 2—Atomicity

Here we argue that the presented protocol satisfies the three levels of atomicity even if message transmissions fail, i.e., the protocol is fault tolerant. The following assumptions will be made:

A1. For privacy reasons, all communication should be over secured channels. Secured channels can be provided in well established ways using the public keys of the merchant, archive, and bank. Even if privacy is not essential, some encryption is important to prevent the merchandise from being prematurely or incorrectly divulged. Message P4 must be encrypted so that k is not prematurely revealed to a snooping customer. Message P1 should also be encrypted, or else a snooping archive or bank would have access to merchandise at the end of the transaction.

A2. The archive will eventually publish exactly one of message P5a or message P5b.

A3. The archive will not reveal k unless it makes message P5a available to the merchant (generally by publishing message P5a).

Justification and discussion of assumptions A2 and A3 occurs in section 4.

Money Atomicity

To justify the claim of money atomicity, we will show that money is neither created nor destroyed. In this context, we show that at any point in time the value of the token verifiably belongs to exactly one participant.

At the beginning of the protocol, the value belongs to the customer, as can be proved by her possession of the secret key (q) corresponding to the token (Q*). Once the customer issues message P2, the value is locked to the transaction. While the value has not yet been transferred, the customer may not reuse the token for another transaction unless a corresponding message P5b is obtained. If message P5a is published instead, then the value transfers to the merchant on publication. By assumption A2, precisely one of message P5a or message P5b will be published. The bank transfers the value on seeing message P5a (it already has message P2). On seeing message P5b, the bank unlocks the token, enabling free use of the token's value by the customer.

Goods Atomicity

To justify the claim of goods atomicity, we will show that the goods will be made available to the customer if and only if the funds are transferred to the merchant. First we consider the case that the merchant receives the value, and show that the merchandise will be made available to the customer. If the bank transfers the value and the customer complains, the bank must display messages P2 and P5a to justify its action. However, message P5a contains k, and thus the $E_k$[merchandise] (contained in message P1) can now be decrypted with k, giving the customer merchandise. Now consider the case that the customer obtains access to the merchandise. Because the customer only has access to $E_k$[merchandise], that means that the customer has obtained k. By assumptions A1 and A3 that means that the archive has published message P5a. Now the merchant may use messages P3 and P5a to demand transfer of the specified value.

Certified Delivery

To justify the claim of one-sided certified delivery, we will show that the customer can prove what goods were delivered. If the transaction has committed, then messages P5a and P1 contain the merchant's signature on the encrypted merchandise, the contract, and the decryption key (linked by n). Together these can be used to prove what was promised and what was delivered. If these differ, this can demonstrate to an outside party that the merchant delivered incorrect merchandise.

The protocol discussed above in conjunction with FIG. 4 supports one-sided certified delivery. It enables the customer, but not the merchant, to prove the contents of the merchandise. If two-sided certified delivery is desired, then the customer must send the merchant a signature (using q) of message P1 before the merchant issues message P4. This signature may be sent directly or piggy-backed onto message P2 and message P3. In either case, Q can be included in message P1 and/or message P3 so that the merchant will be able to verify the signature of message P1 with q.

Two-sided certified delivery requires the merchant to store certain messages; message P1, so that the signature can be verified, and $S_q$(P1) and message P5a to prove the contents of the delivery in the absence of customer cooperation. This signature (together with the signed message) could also be included in message P4 and stored by the archive if extra logging is desired.

Section 3—Data Management

To maintain accountability and correct operation of the protocol, certain data and signatures should be maintained. This section explains the data storage by the participants. To limit data storage requirements, certain time limits can be imposed. The lifetime of a token Q* can be bounded. Tokens not used before this time lose their value. This will require that unused tokens are occasionally refreshed (i.e. exchanged for tokens whose lifetimes end later). The lifetime of a transaction can also be bounded. This bound may be measured from the expiration already included, or it may be included separately. Before a transaction's lifetime ends, the transaction will complete (commit or abort) to all parties' satisfaction, or evidence (in the form of messages, particularly messages P5a or P4) should be additionally certified (e.g. signed and dated by a trusted authority or published in a public forum). The option of additional certification is used in the case where the lifetime of the transaction is near its end. This option prevents a party from stalling action until past the transaction's lifetime.

The customer should save messages P1 and P5a until the goods have been verified to be satisfactory.

The merchant should save message P3 until the value is transferred. (In the case of two-way certified delivery, the merchant must store $S_q$(P1) and message P5a for some time period long enough to ensure that the customer has had time to complain.)

The bank should store messages P2 and P5a for some period after the transaction. This data should then be kept until the expiration date of the token Q*, otherwise the bank will be unable to prove that Q* has been spent.

The archive should store its published message P5a for some time period past the expiration (as specified in message P5a). This enables the archive to support the claims of the other parties. Additionally, the archive should not publish message P5b once message P5a has been published, so it should remember all P5a messages until past the transaction lifetime (which must be derivable from message P5a or message P5b).

Section 4—Trust

This section explains what trust is necessary between the parties of the protocol. Our trust discussion will be driven by the consideration of our atomicity goals. Our crucial assumptions for proving atomicity are A3 and A2.

If the archive violates A2, this violation will be detectable. If the archive fails to produce message P5a before expiration, then the archive is required to produce message P5b on demand. The archive's failure to produce message P5b can be observed by any party. If the archive produces both messages P5a and P5b, then it has produced signed contradictory statements, and will be held liable for the value of the transaction. If the bank conspires with the archive, then detecting this fraud will require extra communication between the merchant and the customer. Thus assumption A2 can be easily enforced in practice.

The other major archive assumption A3 is not as easily enforced. Once k has been revealed to the archive in message P4, then the archive could reveal k to the customer. Without an extra mechanism, the archive and customer can dishonestly collude to obtain access to the goods without giving payment to the merchant, violating goods atomicity. The archive has no justification for not publishing message P5a if it receives message P4 before expiration. In practice this means that the archive's non-responsiveness can be automatically detected and certified by any authority at the merchant's request. This detection must take place prior to expiration, otherwise the archive would no longer be obligated to produce message P5a. This need for (possibly enforced) trust in the archive by the merchant helps to motivate the existence of the archive as a separate entity. Some alternatives approaches will be discussed in the next section.

Section 5—Variations

5.1 Efficiency Extensions

The protocol as discussed involves the generation of a new public key for every token, and each transaction uses the value of exactly one token. There are several modifications to the basic protocol which remove these restrictions.

Customer Key Reuse

If generation of the temporary public key is computationally expensive, then the same key pair (Q,q) may be reused with different tokens (Q*) (the certifying information accompanying Q will be different for each token). The bank will now be able to link several purchases with each other but will not be able to link purchases to the identity of the customer.

Token Reuse

There is nothing in the protocol which requires that tokens be spent completely. If a value, corresponding to the desired payment amount, is included in message P2, then the same token may be reused, incrementally spending the value. As each amount of the token is spent, the bank acquires proof that the corresponding amount is spent. This improves efficiency and flexibility, but will allow transaction linking as in the previous paragraph.

Multiple Token Transactions

A likely token model involves tokens which have a set of fixed denominations (analogous to currency). With fixed denomination tokens, single token transactions will not be able to match the arbitrary prices of merchandise. Multiple tokens can be used in a single transaction by including them in message P2, and, instead of signing message P2 once with q, signing it repeatedly—once with each secret key which controls one of the included tokens. This enables arbitrary payments with collections of fixed value tokens. The extra overhead involved can be offset by key reuse as detailed above.

5.2 Certified Delivery Variations

Figure 4:
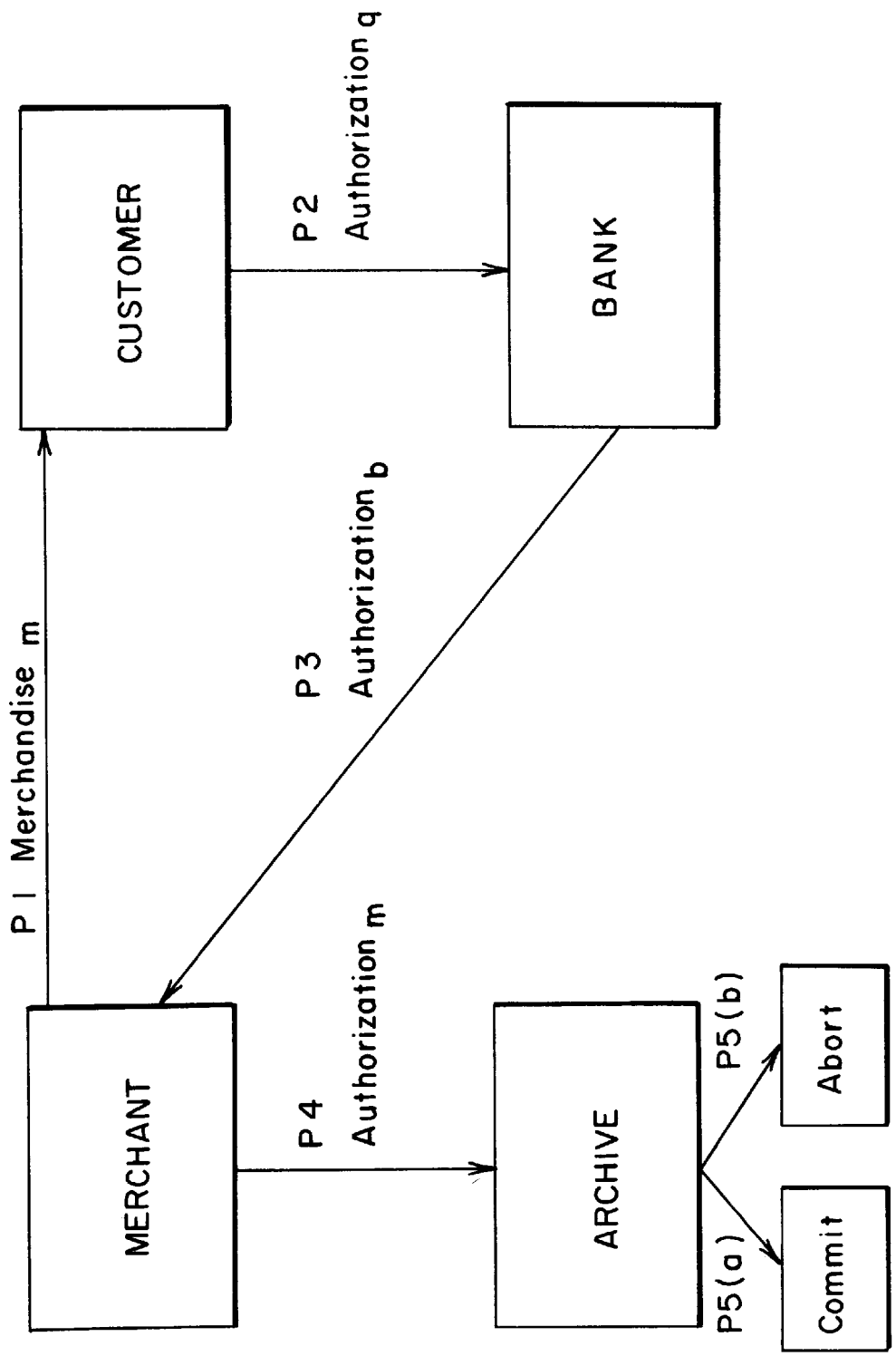
FIG. 4 is a diagram illustrating the steps of another protocol for anonymous certified delivery of goods according to the present invention.

The protocol illustrated in FIG. 4 provides one-way certified delivery, while the modification discussed in section 2 under the heading Certified Delivery provides two-way certified delivery. If the certified delivery assertions are to have value beyond the value of purchase (e.g. compensatory or punitive damages), even in the case of possible bank dishonesty, then a pseudonym key pair P,p (selected by C) should have its public half P included in contract in message P1. P need not be different from Q, but it can be. P could also be used instead of Q in supporting two-sided certified delivery

5.3 Non-Anonymous Transactions

The protocols presented here provide atomic transactions for a generic token based currency. While the clearest value of the protocols comes in its support for anonymity, anonymity is not a necessary feature in the protocols.

5.4 Early Customer Commitment

Figure 5:
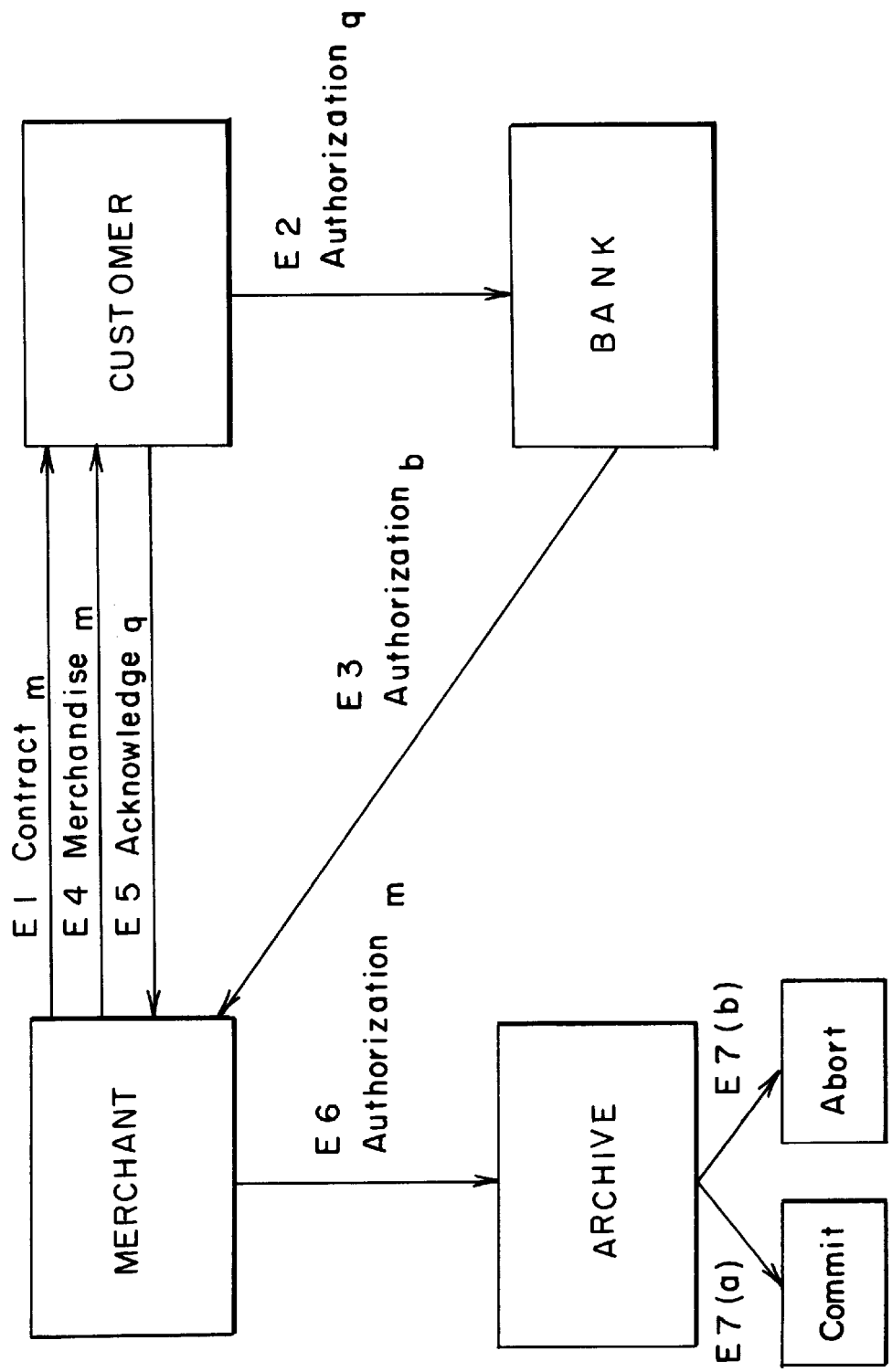
FIG. 5 is a diagram illustrating a protocol which requires early customer commitment.

If the merchandise has significant production cost, then the merchant may be unwilling to generate merchandise without some assurance that the transaction will complete. The following protocol, shown in FIG. 5, locks the token to the transaction before the merchandise is transmitted.

E1. M→C $S_m$(n,M,contract,r)—Contract$_m$
E2. C→B $S_q$(n,expiration,M,A,Q*)—Authorization$_q$
E3. B→M $S_b$(n,expiration,M,A,Q,value)—Authorization$_b$
E4. M→C $S_m$(n,$E_k$(merchandise))—Merchandise$_m$
E5. C→M $S_q$(E4)—Acknowledge$_q$
E6. M→A $S_m$(n,expiration,k)—Authorization$_m$
E7. (a) A publishes $S_a$($S_m$(n,expiration,k⊕r))—Commit
   (b) A publishes $S_a$(n,expiration,M,failed)—Abort This protocol requires more messages than the protocol of FIG. 4, but does automatically provide two-sided certified delivery. The field r in message E1 is a random number with the same length as k. In message E7a, k⊕r refers to the bitwise exclusive-or of k and r. This random number r is used as a one-time-pad encrypting the merchandise key.

If the customer fails to produce message E5 sufficiently fast, the merchant may force the transaction to commit by sending both messages E4 and E6 to the archive. In this case, the archive should publish $S_a$(E4) in addition to message E7a. To justify transferring the value of the token, the bank will additionally require that the merchant produce the signature of either q or a on message E4. This additional signature proves that the merchant delivered the merchandise to either the customer (if g) or the archive (if a).

Because the archive may publish both $S_a$(E4) and message E7a, it is important that these together not divulge the merchandise to any unintended parties. This is the reason for the introduction of r and the difference between messages P5a and E7a. In this protocol variant, messages E1, E4, and E7a are all needed to obtain merchandise.

5.5 Joint Bank-Archive

In the protocol described in FIG. 4, there are two agents, other than merchant and customer. The bank regulates token use, and the archive controls transaction commitment. These roles need not be separated. Having a single entity act as both bank and archive enables a streamlining of the protocol but also requires slightly stronger trust by the merchant.

Figure 6:
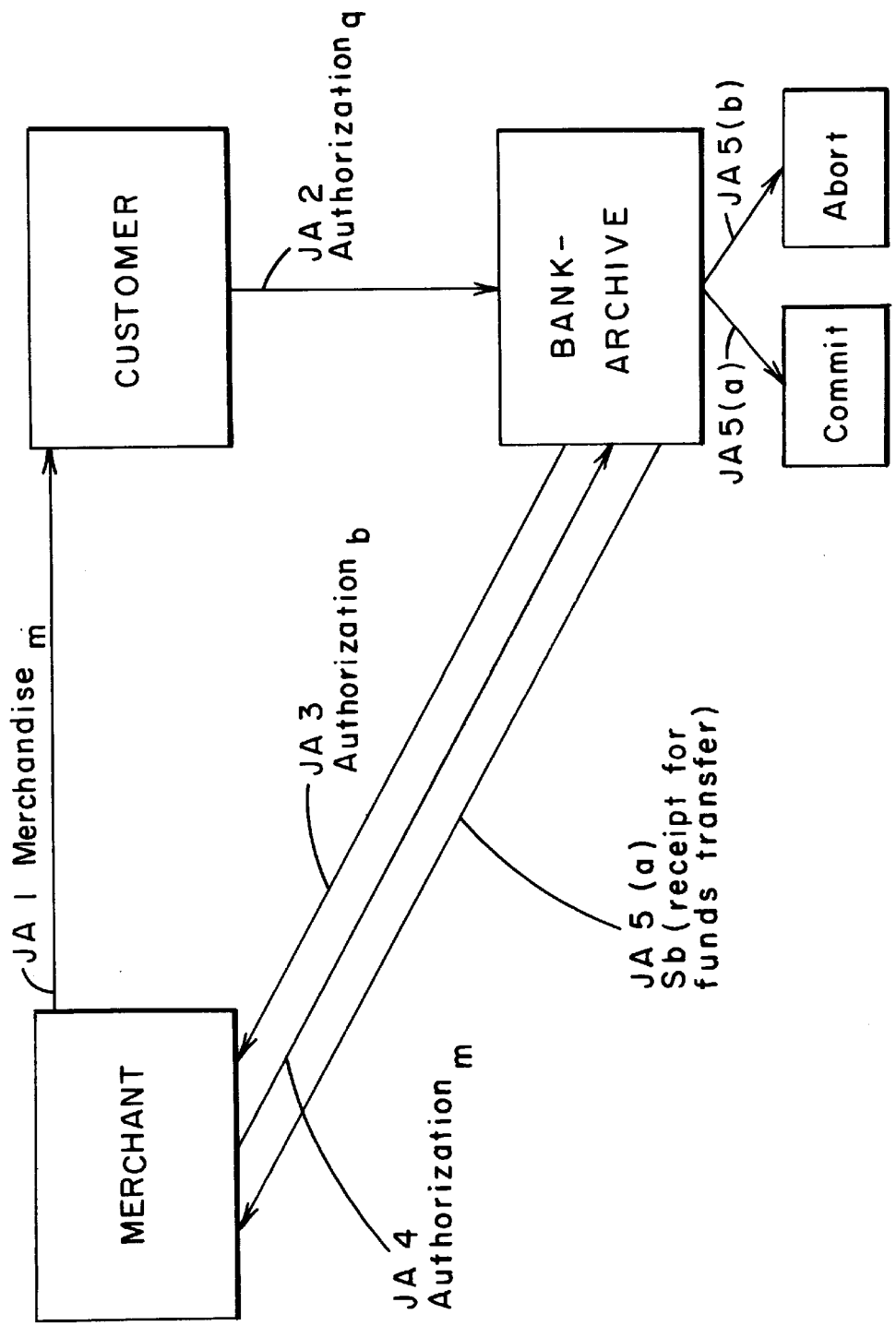
FIG. 6 is a diagram illustrating a protocol where the bank also provides the function of the archive.

A diagram illustrating the protocol of FIG. 4 but with a joint bank-archive is shown in FIG. 6. The messages of the protocol illustrated in FIG. 6 are:

JA1. M→C $S_m$(n,contract,$E_k$(merchandise))—Merchandise$_m$
JA2. C→B $S_q$(n,expiration,M,Q*)—Authorization$_q$
JA3. B→M $S_b$(n,expiration,M,value)—Authorization$_b$
JA4. M→B $S_m$(n,expiration,k)—Authorization$_m$
JA5.
  (a) B publishes $S_b$($S_m$(n,value,expiration,k))—Commit
     B→M $S_b$(receipt for funds transfer)
  (b) B publishes $S_b$(n,expiration,M,failed)—Abort The protocol is very similar to that of FIG. 4, except that the roles of bank and archive would be filled by the same entity. The only change in the necessary trust would be that the bank-archive has a more direct interest in violating assumption A2. If the bank-archive sent message JA5a to the customer but sent message JA5b to the merchant, then neither would believe they had rights to the value of the token, violating money atomicity. The signatures by the bank on these messages (JA5a,JA5b) could be used to detect (and prove) this fraud.

Figure 7:
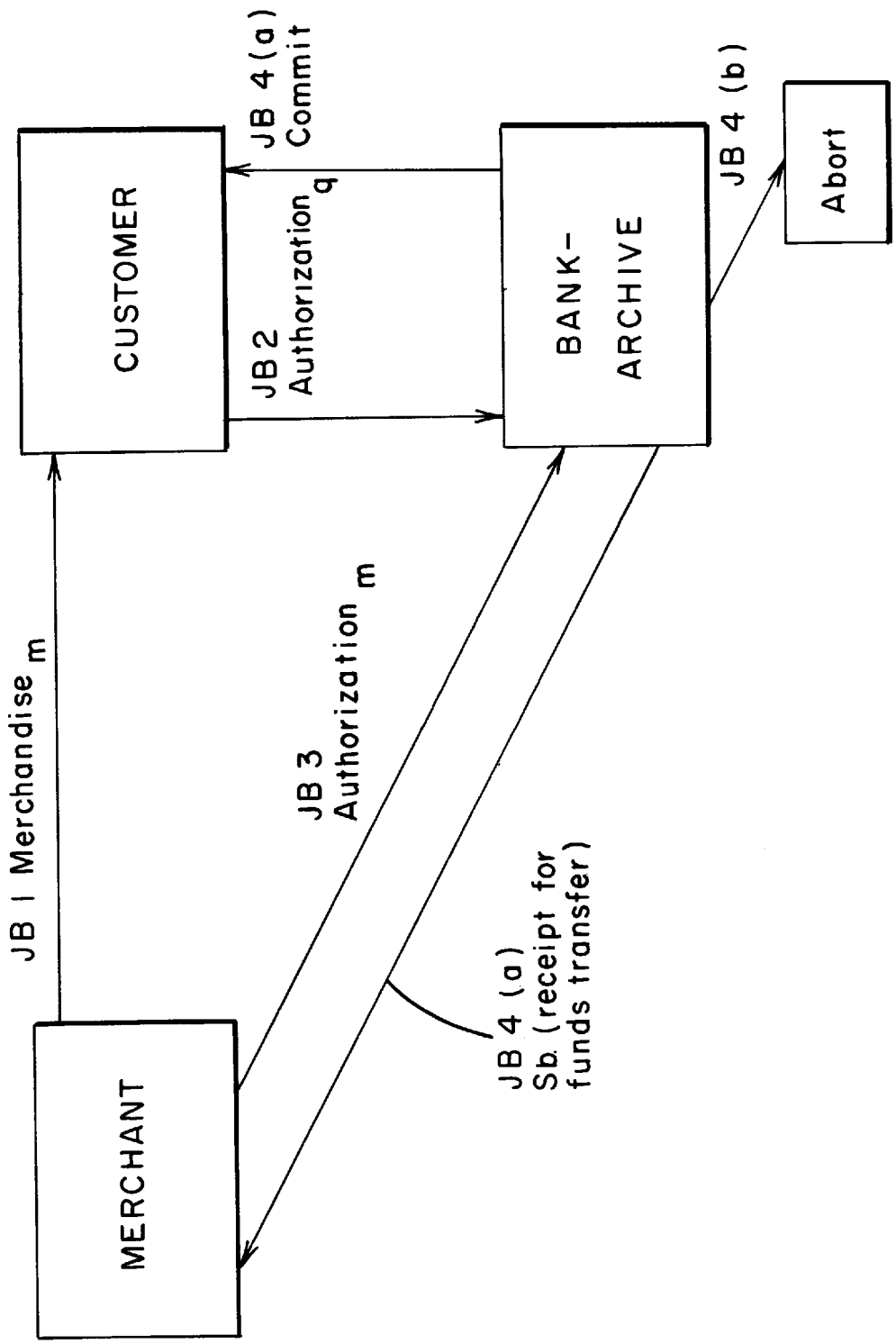
FIG. 7 is a diagram illustrating an alternative embodiment of the combined bank-archive protocol.

Another alternative joint bank-archive protocol is shown in FIG. 7. The messages of the protocol illustrated in FIG. 7 are:

JB1. M→C $S_m$(n,contract,$E_k$(merchandise))—Merchandise$_m$
JB2. C→B $S_q$(n,expiration,M,Q*)—Authorization$_q$
JB3. M→B $S_m$(n,expiration,k)—Authorization$_m$
JB4.

(a) B→C $S_b(S_m(n,expiration,k))$—Commit
    B→M $S_b$(receipt for funds transfer)
(b) B publishes $S_b(n,expiration,M,failed)$—Abort This protocol uses fewer messages than the direct adaptation of the protocol to the joint bank-archive variation, but has stronger trust requirements. In this version, the enforcement (as described in section 4) of assumption A3 is more difficult. The bank-archive can have legitimate reasons for not processing a transaction even if message JB3 is received (e.g. if Q* is not a valid unlocked token of the correct value).

In both joint bank-archive protocols, the completion phase is simplified by the removal of the archive to bank communication. This allows the bank to combine the commitment of the transaction with its completion actions. These combined actions (for each joint bank-archive protocols) are described by their respective Commit and Abort steps.

5.6 Optimizing for Archive Cooperation

As mentioned in the discussion of section 2 with respect to completing the transaction, the merchant may send message P4 to the archive and the customer simultaneously. This speeds the completion of the transaction for the customer, but leaves the possibility that the merchant will be denied payment (if the archive fails to publish message P5a) while the customer receives the merchandise. If the detection methods for archive non-responsiveness (used to justify A3 in section 4) are used, the risk of a non-responsive archive may be controlled if there is sufficient time prior to expiration.

5.7 Repeated Transactions

Figure 8:
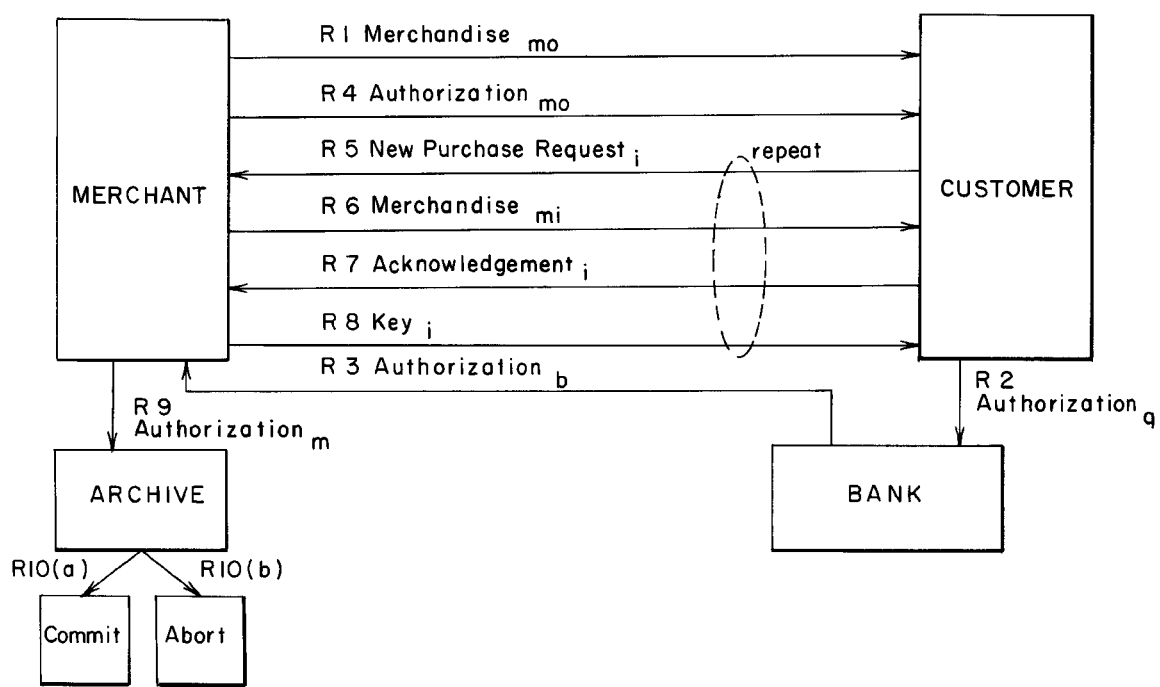
FIG. 8 is a diagram illustrating a protocol for handling repeated transactions.

A likely scenario for low-value electronic purchases would be a customer making many purchases consecutively at the same merchant as shown in FIG. 8. A sequence of transactions with the same merchant can be handled with fewer messages per transaction than can a sequence of transactions to different merchants. The involvement of the bank and archive can be limited to that in the single transaction case.

R1. M→C $S_m(n,contract_0,E_{k0}(merchandise))$—Merchandise$_{m0}$
R2. C→B $S_q(n,expiration,M,A,Q^*)$—Authorization$_q$
R3. B→M $S_b(n,expiration,M,A,Q,value)$—Authorization$_b$
R4. M→C $S_m(n,0,k_0)$—Authorization$_{m0}$
R5. C→M purchase request$_i$
R6. M→C $S_m(n,contract_i,E_{ki}(merchandise),running\_total_i)$—Merchandise$_{mi}$
R7. C→M $S_q(R6)$—Acknowledgement$_i$
R8. M→C $S_m(n,i,k_i)$—Key$_i$
R9. M→A $(n,k_j,expiration,j)$—Authorization$_m$
R10. (a) A publishes $S_a(S_m(n,j,expiration,k_j))$—Commit
     (b) A publishes $S_a(n,expiration,M,failed)$—Abort The subscripts (i and 0) on k, merchandise, contract, and running_total index the order of the transactions in the sequence. The variables running_total$_i$ indicate what amount of the token has been spent in transactions up to the $i^{th}$. Messages R5–R8 repeat for each new transaction. At any time, the merchant may perform message R9. Message R10a then commits all transactions in the sequence up to and including j, where j is the final value of variable i. A new sequence should now be opened. This protocol provides two-sided certified delivery and relies on archive assumptions similar to section 5.5. In practice the merchant will balance the increased risk of performing many transactions without recourse to the archive against the savings of reduced communications. Message complexity could be reduced even further (to two messages per transaction) at the cost of the merchant potentially having to archive the merchandise of the final transaction (similar to section 5.4).

5.8 Pseudonymous Customer Key

In the two-sided certified delivery (sections 5.2, 5.4, 5.7) protocols, Q is known to the merchant. It is possible instead that a pseudonym key pair (say P,p) may be used in place of Q,q. P can be provided to the bank as part of Authorization$_q$, and then passed to the merchant in place of Q. This allows the customer greater flexibility in preventing the merchant from linking purchases as being made by a single customer by observing use of a common key pair.

While the present invention has been described in connection with preferred embodiments thereof, many modifications and variations will be apparent to those of ordinary skill in the art. The following claims are intended to cover all such modifications and variations.

What we claim is:

1. A fault-tolerant method of purchasing digital goods with a digital token in which the token's value resides either with a customer or with a merchant, comprising the steps of:

initiating a transaction with a merchant for a digital good;

sending a merchant-signed invoice and the digital good in encrypted form from the merchant to a customer;

signing the invoice with the customer's signature to produce a countersigned invoice;

sending the countersigned invoice, a token, and identifying information for the token from the customer to the merchant;

sending the countersigned invoice, the token, and the identifying information for verification;

verifying the token with the identifying information and verifying the other information in the countersigned purchase order;

committing the transaction when the token and other information in the countersigned purchase order are verified such that the value of the token is transferred from the customer to the merchant;

completing the transaction by making a key for decrypting the digital good available to the customer; and retaining records of the transaction.

2. The method of claim 1 wherein said step of sending identifying information for the token includes the step of sending a hash of the token.

3. The method of claim 2 wherein said step of sending the countersigned invoice for verification includes the step of sending the countersigned invoice to an archive for verification.

4. The method of claim 1 wherein said step of verifying the other information in the countersigned invoice includes the step of determining if the price of the goods and the value of the token are the same.

5. The method of claim 1 additionally comprising the step of communicating to the merchant's bank the transfer of the token's value to the merchant.

6. The method of claim 1 wherein said step of retaining records includes the step of storing the identifying information and the token.

7. The method of claim 1 additionally comprising the steps of:

sending verification information for the encrypted digital good with the merchant-signed invoice from the merchant to the customer;

calculating corresponding verification information for the received encrypted digital good;

comparing the calculated verification information to the received verification information; and one of terminating the purchase or resending the encrypted digital good if the verification information is not the same.

8. The method of claim 1 wherein said token is an anonymous token and wherein said identifying information includes registration information.

9. A method of purchasing digital goods with a digital token belonging to a customer in which the value of the token resides with only one party at a time, comprising:

initiating a transaction with a merchant for a digital good;

transferring the digital good in an encrypted form from the merchant to a customer;

locking at least a portion of the value of the token to the transaction;

sending a digital token and transactional information to the merchant;

verifying the transactional information and the value of the token;

providing a decryption key to the customer;

unlocking said locked value of the token and transferring said value to the merchant; and retaining a record of the transaction.

10. The method of claim 9 wherein said step of verifying the value of the token includes the step of verifying if the value of the token has been previously spent.

11. The method of claim 9 wherein said step of providing the decryption key to the customer includes the step of sending the key to the customer.

12. The method of claim 9 additionally comprising the step of reusing the token until the entire value of the token is transferred.

13. The method of claim 9 wherein said step of sending the digital token includes the step of sending an anonymous token and identifying information.

14. The method of claim 9 wherein the token has a key associated therewith, said method including the step of generating a customer signature with the key associated with the token, and wherein said step of sending transactional information includes the step of sending the customer signature.

15. The method of claim 9 wherein said step of sending a token includes the step of sending multiple tokens.

16. The method of claim 15 wherein each token has a key associated therewith, said method including the step of generating customer signatures with the keys associated with the tokens, and wherein said step of sending transactional information includes sending the generated signatures.

17. The method of claim 9 wherein said step of verifying the transactional information includes the step of determining if the price of the goods and the value of the token are the same.

18. The method of claim 9 additionally comprising the step of communicating to the merchant's bank the transfer of the token's value to the merchant.

19. The method of claim 9 wherein said step of sending transactional information includes the step of sending a public half of a customer chosen asymmetric key pair.

20. The method of claim 9 wherein said step of verifying the value of the token is performed by one of a bank, the merchant, or an archive.

21. A method of purchasing digital goods with a digital token belonging to a customer in which the value of the token resides with only one party at a time, comprising:

initiating a transaction with a merchant for a digital good;

locking at least a portion of the value of the token to the transaction;

sending an entity signed purchase approval including a digital token and transactional information to the merchant;

transferring the digital good in an encrypted form from the merchant to a customer after the value of the token is locked to the transaction;

providing a decryption key to the customer;

unlocking said locked value of the token and transferring said value to the merchant; and retaining a record of the transaction.

22. The method of claim 21 wherein said step of initiating a transaction includes the step of sending a merchant signed invoice from the merchant to the customer.

23. The method of claim 21 wherein said step of locking at least a portion of the value of the token includes the step of sending a customer signed purchase authorization from the customer to an entity for verification.

24. The method of claim 21 wherein said entity performs the step of sending the entity signed purchase approval.

25. The method of claim 24 additionally comprising the step of verifying the entity signed purchase approval.

26. The method of claim 25 wherein said step of verifying the entity signed purchase approval is performed by one of the merchant or an archive.

27. The method of claim 26 wherein the merchant forces the transaction to commit by sending a copy of the message transferring the digital good and a copy of the message verifying the entity signed purchase approval to an archive.

28. The method of claim 27 wherein the decryption key is encoded.

29. The method of claim 21 wherein said step of transferring the encrypted digital good includes the step of transferring a merchant signature with the encrypted good.

30. The method of claim 29 additionally comprising the steps of adding a customer signature to the merchant signature and sending the encrypted good and the signatures from the customer to the merchant.

31. A method for purchasing digital goods with a digital token belonging to a customer in which the value of the token resides with only one party at a time, comprising:

initiating a transaction with a merchant for a digital good;

transferring the digital good in an encrypted form from the merchant to a customer;

sending a digital token and transactional information to an entity for verification;

locking at least a portion of the value of the token to the transaction;

verifying the transactional information and the value of the token;

providing a decryption key to the entity;

unlocking said locked value of the token and transferring said value to the merchant;

completing the transaction by making the key available to the customer; and retaining a record of the transaction.

32. The method of claim 31 wherein said step of transferring the digital good includes the step of sending a merchant signed invoice and the encrypted digital good from the merchant to the customer.

33. The method of claim 31 wherein said step of sending transactional information includes the step of sending a customer-signed authorization from the customer to an entity for verification.

34. The method of claim 31 wherein said step of providing a decryption key to the entity includes the step of sending a merchant-signed key from the merchant to the entity.

35. The method of claim 31 wherein said step of completing the transaction includes the step of sending an entity-signed key from the entity to the customer and wherein said step of unlocking said locked value of the token includes the step of sending an entity-signed unlocked value of the token from the entity to the merchant.

36. The method of claim 31 wherein said step of verifying the value of the token includes the step of verifying if the value of the token has been previously spent.

37. The method of claim 31 wherein said step of providing the decryption key to the entity includes the step of storing the key at an archive which both the entity and the merchant can access.

38. The method of claim 37 additionally comprising the step of verifying that an expiration time for the transaction has not passed before the decryption key is stored at the archive.

39. The method of claim 37 additionally comprising the step of the archive countersigning the decryption key and wherein said step of retaining records includes the step of retaining the countersigned decryption key.

40. The method of claim 39 additionally comprising the step of the merchant demonstrating that the value of the token has been transferred by providing a copy of the archive countersigned decryption key.

41. The method of claim 31 wherein the value of the token remains locked until the transaction is one of aborted or completed by providing the decryption key to the customer.

42. The method of claim 31 wherein said step of providing the decryption key to the entity includes the step of sending the key to the entity.

43. The method of claim 31 additionally comprising the step of reusing the token until the entire value of the token is transferred.

44. The method of claim 31 wherein said step of sending the digital token includes the step of sending an anonymous token and identifying information.

45. The method of claim 31 wherein the token has a key associated therewith, said method including the step of generating a customer signature with the key associated with the token, and wherein said step of sending transactional information includes the step of sending the customer signature.

46. The method of claim 31 wherein said step of sending a token includes the step of sending multiple tokens.

47. The method of claim 46 wherein each token has a key associated therewith, said method including the step of generating customer signatures with the keys associated with the tokens, and wherein said step of sending transactional information includes sending the generated signatures.

48. The method of claim 31 wherein said step of verifying the transactional information includes the step of determining if the price of the goods and the value of the token are the same.

49. The method of claim 31 additionally comprising the step of communicating to the merchant's bank the transfer of the token's value to the merchant.

50. The method of claim 31 wherein said step of sending transactional information includes the step of sending a public half of a customer chosen asymmetric key pair.

51. The method of claim 31 wherein said step of verifying the value of the token is performed by one of a bank, the merchant, or an archive.

52. A method of purchasing digital goods with a digital token belonging to a customer in which the value of the token resides with only one party at a time, comprising:

initiating a transaction with a merchant for a digital good;

transferring the digital good in an encrypted form from the merchant to a customer;

sending a digital token and transactional information to an entity for verification;

locking at least a portion of the value of the token to the transaction;

verifying the transactional information and the value of the token;

providing a decryption key to the customer;

unlocking said locked value of the token and transferring said value to the merchant;

retaining a record of the transaction; and repeating the foregoing steps until a sequence of transactions is completed.

53. A fault-tolerant method of purchasing digital goods with a digital token in which the delivery of goods is atomic, comprising the steps of:

establishing a price with a merchant for a digital good;

sending a merchant-signed invoice and the digital good in encrypted form from the merchant to a customer;

sending a customer-signed purchase authorization including the token from the customer to a bank for verification;

verifying the customer-signed purchase authorization;

sending a bank-signed purchase approval from the bank to the merchant for verification;

verifying the bank-signed purchase approval;

completing the transaction by making the key for decrypting the digital good available to the customer; and retaining records of the transaction.

54. A fault-tolerant method of purchasing digital goods with a digital token in which the token's value resides either with a customer or with a merchant, comprising the steps of:

initiating a transaction with a merchant for a digital good;

sending a merchant-signed invoice and the digital good in encrypted form from the merchant to a customer;

signing the invoice with the customer's signature to produce a countersigned invoice;

sending the countersigned invoice, a token, and identifying information for the token, including a hash of the token, from the customer to the merchant;

sending the countersigned invoice to an archive for verification, wherein said archive stores the hash of the token in conjunction with a key for the token;

sending the token and the identifying information for verification;

verifying the token with the identifying information by using the key stored in conjunction with the hash of the token, and verifying the other information in the countersigned purchase order;

committing the transaction when the token and other information in the countersigned purchase order are verified such that the value of the token is transferred from the customer to the merchant;

completing the transaction by making a key for decrypting the digital good available to the customer; and retaining records of the transaction.

55. A fault-tolerant method of purchasing digital goods with a digital token in which the token's value resides either with a customer or with a merchant, comprising the steps of:

initiating a transaction with a merchant for a digital good;

sending a merchant-signed invoice and the digital good in encrypted form from the merchant to a customer;

signing the invoice with the customer's signature to produce a countersigned invoice;

sending the countersigned invoice, a token, and identifying information for the token from the customer to the merchant;

sending the countersigned invoice, the token, and the identifying information for verification;

verifying the token with the identifying information and verifying the other information in the countersigned purchase order;

committing the transaction when the token and other information in the countersigned purchase order are verified such that the value of the token is transferred from the customer to the merchant;

completing the transaction by making a key for decrypting the digital good available to the customer; and storing the identifying information, the token, and the countersigned invoice.

56. A method of purchasing digital goods with a digital token belonging to a customer in which the value of the token resides with only one party at a time, comprising:

initiating a transaction with a merchant for a digital good;

transferring the digital good in an encrypted form from the merchant to a customer;

locking at least a portion of the value of the token to the transaction;

sending a digital token and transactional information to the merchant;

verifying the transactional information and the value of the token;

storing a decryption key at an archive which both the customer and the merchant can access;

unlocking said locked value of the token and transferring said value to the merchant; and retaining a record of the transaction.

57. The method of claim 56 additionally comprising the step of verifying that an expiration time for the transaction has not passed before the decryption key is stored at the archive.

58. The method of claim 56 additionally comprising the step of the archive countersigning the decryption key and wherein said step of retaining records includes the step of retaining the countersigned decryption key.

59. The method of claim 58 additionally comprising the step of the merchant demonstrating that the value of the token has been transferred by providing a copy of the archive countersigned decryption key.

60. A method of purchasing digital goods with a digital token belonging to a customer in which the value of the token resides with only one party at a time, comprising:

initiating a transaction with a merchant for a digital good;

transferring the digital good in an encrypted form from the merchant to a customer;

locking at least a portion of the value of the token to the transaction;

sending a digital token and transactional information to the merchant;

verifying the transactional information and the value of the token;

providing a decryption key to the customer;

unlocking said locked value of the token and transferring said value to the merchant; and retaining a record of the transaction, wherein the portion of the value of the token remains locked until the transaction is one of aborted or completed by providing the decryption key to the customer.

61. A method of purchasing digital goods with a digital token belonging to a customer in which the value of the token resides with only one party at a time, comprising:

initiating a transaction with a merchant for a digital good;

transferring the digital good in an encrypted form from the merchant to a customer;

locking at least a portion of the value of the token to the transaction;

sending a digital token and transactional information to the merchant;

verifying the transactional information and the value of the token;

providing a decryption key to the customer;

sending a hash of the encrypted digital good to the customer;

calculating a hash of the received encrypted digital good;

comparing the calculated hash to the received hash;

one of aborting the transaction or resending the encrypted digital good if the hashes are not equal;

unlocking said locked value of the token and transferring said value to the merchant; and retaining a record of the transaction.

62. A method of purchasing digital goods with a digital token belonging to a customer in which the value of the token resides with only one party at a time, comprising:

initiating a transaction with a merchant for a digital good;

locking at least a portion of the value of the token to the transaction;

the entity sending an entity-signed purchase approval including a digital token and transactional information to the merchant;

one of the merchant and an archive verifying that the entity signed the purchase approval;

transferring the digital good in an encrypted form from the merchant to a customer after the value of the token is locked to the transaction;

the merchant forcing the transaction to commit by sending a copy of a message transferring the digital good and a copy of a message verifying that the entity signed the purchase approval to the archive;

providing a decryption key to the customer, wherein the decryption key is encoded using a one-time pad;

unlocking said locked value of the token and transferring said value to the merchant; and retaining a record of the transaction.

63. A method of purchasing digital goods with a digital token belonging to a customer in which the value of the token resides with only one party at a time, comprising:

initiating a transaction with a merchant for a digital good;

locking at least a portion of the value of the token to the transaction;

sending an entity-signed purchase approval including a digital token and transactional information to the merchant;

transferring the digital good in an encrypted form from the merchant to a customer after the value of the token is locked to the transaction;

storing a decryption key at an archive which both the customer and the merchant can access;

unlocking said locked value of the token and transferring said value to the merchant; and retaining a record of the transaction.

64. A method for purchasing digital goods with a digital token belonging to a customer in which the value of the token resides with only one party at a time, comprising:

initiating a transaction with a merchant for a digital good;

transferring the digital good in an encrypted form from the merchant to a customer;

sending a digital token and transactional information to an entity for verification;

locking at least a portion of the value of the token to the transaction;

verifying the transactional information and the value of the token;

sending a hash of the encrypted digital good to the customer;

calculating a hash of the received encrypted digital good;

comparing the calculated hash to the received hash;

one of aborting the transaction or resending the encrypted digital good if the hashes are not equal;

providing a decryption key to the entity;

unlocking said locked value of the token and transferring said value to the merchant;

completing the transaction by making the key available to the customer; and retaining a record of the transaction.

* * * * *

UNITED STATES PATENT AND TRADEMARK OFFICE
CERTIFICATE OF CORRECTION

| | | |
|---|---|---|
| PATENT NO. | : 6,076,078 | |
| DATED | : June 13, 2000 | |
| INVENTOR(S) | : Camp et al. | |

It is certified that error appears in the above-identified patent and that said Letters Patent is hereby corrected as shown below:

<u>Title page,</u> References Cited,
Line 2 delete "Brothers" and substitute therefor -- Brother --.
Line 11, delete "Crypt" and substitute therefor -- CRYPTO --.
Line 13, delete "Obsevers" and substitute therefor -- Observers --.

<u>Column 1,</u>
Line 36, delete "Electronic" and substitute therefor -- electronic --.

<u>Column 3,</u>
Line 28, delete "were" and substitute therefor -- was --.
Line 58, delete ";".

<u>Column 10,</u>
Line 14, delete "tire" and substitute therefor -- time --.

<u>Column 16,</u>
Line 22, delete "g" and substitute therefor -- $q$ --.

Signed and Sealed this

Fifth Day of March, 2002

*Attest:*

JAMES E. ROGAN
*Attesting Officer*   *Director of the United States Patent and Trademark Office*